US006602426B2

(12) United States Patent
Hulsey et al.

(10) Patent No.: US 6,602,426 B2
(45) Date of Patent: Aug. 5, 2003

(54) WATER TREATMENT USING OZONE AND HAVING A REDUCED LIKELIHOOD OF BROMATE FORMATION FROM BROMIDES FOUND IN THE WATER

(75) Inventors: Robert A. Hulsey, Peculiar, MO (US); Jeffrey J. Neemann, Shawnee, KS (US); Ronald E. Zegers, Las Vegas, NV (US); David J. Rexing, Boulder City, NV (US)

(73) Assignee: Black & Veatch Holding Company, Kansas City, MO (US)

( * ) Notice: Subject to any disclaimer, the term of this patent is extended or adjusted under 35 U.S.C. 154(b) by 89 days.

(21) Appl. No.: 09/968,078

(22) Filed: Oct. 1, 2001

(65) Prior Publication Data
US 2003/0070996 A1 Apr. 17, 2003

(51) Int. Cl.$^7$ .................................................. C02F 1/78
(52) U.S. Cl. ...................... 210/754; 210/602; 210/760; 210/199; 210/908
(58) Field of Search ............................... 210/754, 760, 210/199, 908, 602

(56) References Cited

U.S. PATENT DOCUMENTS

| 5,609,766 A | | 3/1997 | Schneider et al. |
| 5,795,487 A | * | 8/1998 | Dallmier et al. |
| 5,888,428 A | * | 3/1999 | Howarth et al. |
| 6,024,882 A | * | 2/2000 | McNeilly et al. |
| 6,277,288 B1 | * | 8/2001 | Gargas |

OTHER PUBLICATIONS

*Proceedings of the 14th Ozone World Congress*, 1999, International Ozone Association, 31 Strawberry Hill Ave., Stamford, CT 06902.

* cited by examiner

*Primary Examiner*—Betsey Morrison Hoey
(74) *Attorney, Agent, or Firm*—John C. McMahon

(57) ABSTRACT

A process and facility for treating and disinfecting water supplies comprising first treating the water with chlorine, then with ammonia, then with ozone to substantially disinfect the water, then passing the water through a filter with microorganisms to reduce the amount of small organic compounds and carbon in the water and finally again treating with chlorine so as to produce a residual level of chlorine in the water.

41 Claims, 7 Drawing Sheets

Fig. 3. Bromate Profile — Constant Log Inactivation (2.0-log)

Fig. 6. AOC Reduction

WATER TREATMENT USING OZONE AND HAVING A REDUCED LIKELIHOOD OF BROMATE FORMATION FROM BROMIDES FOUND IN THE WATER

BACKGROUND OF THE INVENTION

The present application is directed to a process and apparatus for treating water containing bromides with ozone so as to minimize bromate formation from the bromides by the ozone.

Water from lakes and rives must be disinfected before it is considered acceptable as drinking water or delivered to distribution systems. Different disinfectants, including chlorine, have been used for this purpose and ozone is often preferred because it is highly effective, it is relatively quick acting, it produces better tasting water than some other disinfectants and it is readily available. However, ozone produces an undesirable chemical reaction with bromides.

In particular, certain water have significant concentration of various bromides (salt resulting from a reaction with hydrobromic acid wherein bromine is in a negative one oxidation state: $Br^-$). Ozone converts at least some of these bromides to bromates (a salt of bromic acid: $BrO_3^-$). In the past such bromates have not been closely monitored or regulated, but recent U.S. governmental regulations have placed limits on bromates at 10 micrograms per liter of water. There is reason to believe that the acceptable level of bromates will be further reduced to at least 5 micrograms per liter of water.

Direct ozonation of certain fresh water sources at a level producing acceptable disinfection in the water, produces greater levels of bromates than are currently acceptable or will be acceptable in the future.

Since ozone is often a preferred disinfectant, various ways have been developed to try to reduce the bromate formation.

One method to reduce bromate formation is by the addition of ammonia to the water prior to ozonation. This has some beneficial effect, but produces additional problems. Most water systems add some chlorine to the water subsequent to treatment by ozone, as such chlorine remains active in the water longer than the ozone and functions to help maintain the distribution system free of bacteria or other microorganisms after the water leaves the treatment facility. When ammonia is used prior to ozonation to reduce bromate formation, there is substantial residual ammonia in the post ozonation water and this residual ammonia must be neutralized by the chlorine before a free or residual level of chlorine can subsequently form in the water with chlorine addition. As chlorine must be added in a ratio of about 10 to 1 by weight to neutralize the ammonia, the ammonia in the water results in a large chlorine addition and substantial cost. Alternatively, the ammonia can be removed by reaction with microorganisms or physically by air stripping, but both can present problems when large quantities of ammonia must be used in conjunction with comparatively large amounts of ozone.

A second method of reducing bromate production that has been previously used is the reducing of the water pH to less than 6.5 so as to interfere with certain reactions that produce bromates. A major problem of pH control of this type is that substantial quantities of acids must be used to lower the pH and later stoichiometric quantities of bases must be added to the water to return the water to a neutral pH after ozonation. Such a process is both expensive and adds a substantial amount of dissolved solids to the finished water.

SUMMARY OF THE INVENTION

A water treatment process is provided wherein the water initially includes bromides, the water is to be at least partially disinfected with ozone and it is desirable to minimize or reduce the formations of bromates from the bromides as compared to such a process utilizing ozone above and without taking other steps to reduce bromates.

In the process of the invention water is pretreated with chlorine prior to ozonation. The use of chlorine in this way reduces the chemical load in the water requiring oxidation, since the chlorine is effective in oxidizing certain but not all oxidizable components of the water in a relatively short time. This results in less of a chemical load requiring oxidation by ozone, such that substantially less ozone is required to complete oxidation and substantial disinfection of the water, as disinfection results from oxidation of microbes in the water.

Any significant amount of chlorine added as a pretreatment to ozonation reduces the ozone requirement until such point as the chlorine is no longer an effective oxidant. Preferably, the chlorine is added until chlorine demand is met whereat substantially all chorine added prior to the chlorine demand being met is utilized in an oxidation process and subsequent addition of chlorine after the demand is met results in free or residual chlorine remaining in the water.

If chlorine is added past the noted breakpoint, then it is desirable to provide substantial residence and reaction time before ozonation to allow the remaining chlorine to either react with components of the water or to dissipate to a non-detectable or trace amounts. It is important that the residual chlorine level be totally reduced to zero or at least minimized before ozonation, since the free chlorine will react with and waste the ozone, so as to increase the ozone demand. Secondly, the free chlorine can be stripped from the water by the ozone gas and carried into ozone destruct units wherein the chlorine can foul the catalyst used for ozone destruction. Furthermore, if ammonia is utilized, residual chlorine reacts with the ammonia to produce chloramines and reduce the efficacy of the ammonia in reducing bromates.

Therefore, while chlorine can be added prior to ozonation below, at or above the noted breakpoint in accordance with the invention, it is preferred that it be added at or quite close to the breakpoint. The chlorine, especially when used at or below the breakpoint level, results in a reduction in the subsequent ozone dosage required to achieve the same ozone residual and decay rate for disinfection and also a reduction in bromate formation.

It has also been found that the pretreatment with chlorine can be used advantageously and synergistically with pretreatment with ammonia to further reduce the bromate formation resulting from ozone treatment. It is believed that the chlorine reduces the ozone required which in turn reduces the bromates formed. It is also believed that the ammonia interacts with various bromides in the water so as to block reaction with ozone and subsequent conversion of such bromides to bromates. The combination of pretreatment with chlorine and ammonia has been found to work synergistically so as to significantly reduce bromate formation in comparison to water treated only with ozone to produce the same degree of disinfection.

When chlorine and ammonia are used together as pretreatments, it is preferred that the chlorine be added first and then the ammonia. It is also preferred, as noted above, that the chlorine be added at or below the breakpoint prior to any addition of ammonia or alternatively that the chlorine be allowed to react over a relatively long time period or otherwise be dissipated prior to addition of ammonia so that free chlorine does not significantly react with the ammonia and thereby reduce the ability of the ammonia to interfere with production of bromates during ozonation. It is preferred that ammonia be present in the water before and especially during ozonation.

Subsequent to initial chlorine addition at or below the breakpoint or after dissipation of the chlorine, ammonia is injected into the water. Normally, ammonia addition is in the range form 0.01 to 5.0 milligrams per liter of water. Preferably, the ammonia addition would be in the range from 0.1 to 0.5 milligrams per liter with 0.1 milligrams per liter being most preferred with many water supplies; however, the preferred ammonia treatment will depend by choice somewhat on the bromide level in the raw water supply and the ozone required for disinfection. With some of the U.S. water supplies, a treatment with 0.1 to 0.3 milligrams per liter of water of ammonia subsequent to chlorination to the breakpoint and subsequent ozonation, results in a bromate concentration of less than 5 micrograms of bromates per liter of water.

Subsequent to chlorination and injection of ammonia (where used), ozone is added in an amount sufficient to achieve desired levels of disinfection. The quantity of ozone injected into the water under the present invention (whether with just chlorine pretreatment or with chlorine and ammonia pretreatment) is less than is required using just ozone to achieve the same degree of disinfection. In some cases a higher ozone concentration could be used to oxidate and disinfect oxidizable components of the water. The combination of these pretreatments results in lower bromate concentration in the resulting water.

Subsequent to ozonation, residual ozone may be allowed to react and dissipate or may be removed by stripping or the like.

The ozonation process normally produces a substantial quantity of small or short chained organic molecules, such as aldehydes and carboxylic acids, as well as other microorganism assimiable organic carbon or molecules, because the ozonation process breaks some larger molecules (that cannot be assimilated by microorganisms) into such smaller molecules. These smaller molecules are undesirable in the final water supply because such can function as food for microorganisms in the distribution system leading to growth and dispersion of such microorganisms, especially those intended to be destroyed by ozonation. Consequently, it is preferred to reduce or eliminate such molecules. For this reason the water after ozonation is preferably then filtered. The filter may be only an activated carbon filter designed to absorb small organic (and microorganism edible) molecules.

However, preferably, the filters are provided with a matrix of biota (microbes or microorganisms) that effectively assimilate the small organic and edible molecules and produce nonedible by-products. Such biota is known in the art of waste and fresh water treatments and would preferably be an aerobic bacteria.

Furthermore, free ammonia may still be present in the water subsequent to ozonation and additional biota may be provided at such a filter to convert remaining ammonia to nitrites and then further to nitrates, such as is provided by Nitrosomonas and Nitrobacter respectively.

After dissipation of the ozone subsequent to ozonation, it is often desirable to add additional chlorine to maintain a reduced level of or completely prevent microorganism growth in the water in a distribution system subsequent to treatment under the process of the invention. Preferably, such chlorine is added subsequent to passage of the water through a filter of the type described above and, especially subsequent to removal of free ammonia from the water so as to reduce the quantity of chlorine needed to provide a desired free chlorine level in the water. Ammonia is removed prior to the second addition of chlorine, as the ammonia would otherwise react with the chlorine. Preferably, chlorine is added after ozonation above a breakpoint for the chlorine in the water, so that there is free or residual chlorine present in the water. The level of residual chlorine depends on the distribution system and the desires of the operators of that system; however, a level of 1.5 milligrams of chlorine per liter of water passing into the distribution system has been found to be an effective amount in many facilities. The chlorine also functions to further disinfect the water subsequent to the filter to remove microorganisms that may enter the water at the filter.

In summary it is desired to provide a facility and method of treatment of water so as to disinfect such water at least partially with ozone while minimizing production of bromates from bromides in the water and while maintaining at a minimum the use of other chemicals in the treatment of the water.

OBJECTS AND ADVANTAGES OF THE INVENTION

Therefore the objects of the present invention are: to provide a process for disinfecting water including bromides with ozone so as to reduce the production of bromates from the bromides; to provide such a process wherein chlorine is used to pretreat the water prior to ozonation; to provide such a process wherein ammonia is used to treat the water subsequent to the pretreatment with chlorine and before the treatment with ozone; to provide such a process wherein the water is treated by filtration and thereafter chlorination subsequent to ozonation; to provide facilities for such a process; and to provide such a process that is easy to operate, utilizes readily available chemicals, is comparatively inexpensive to operate and is especially well suited for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE ILLUSTRATED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
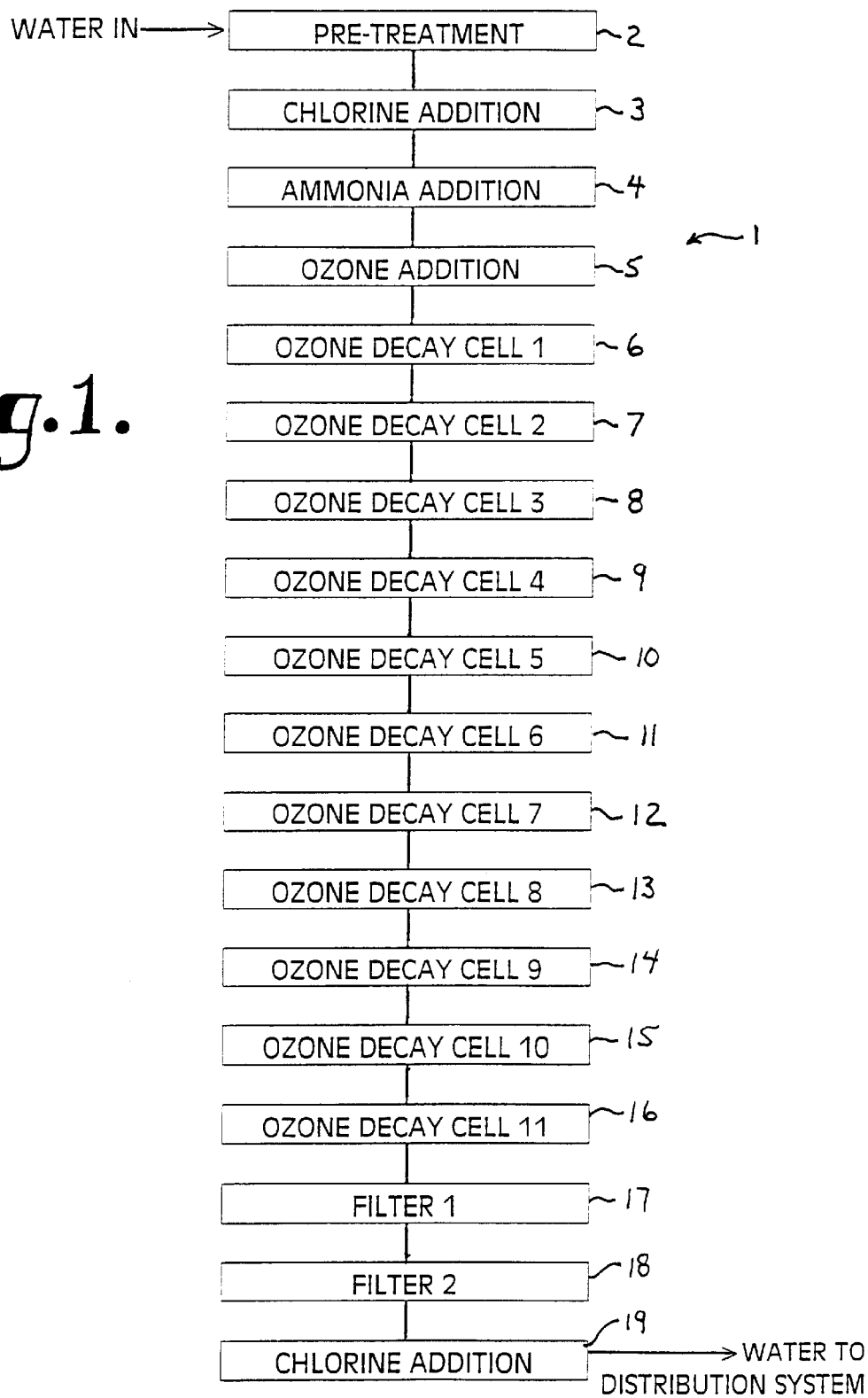
FIG. 1 is a schematic drawing of a water treatment facility according to the present invention.

Shown in FIG. 1 is a schematic drawing of a water treatment facility utilizing the process of the present invention to limit bromate production in water disinfected with ozone and generally represented by the reference numeral 1.

The facility 1 includes a pretreatment processing area 2 wherein water is filtered, clarified and the like prior to disinfecting to remove large solids. The facility also includes a series of treatment areas and cells 3 to 16 which may be independent tanks or sections of a continuous channel wherein water is disinfected. The illustrated facility 1 is a continuous flow plant. Chlorine is added in chemical addition area 3 followed by ammonia addition in chemical addition area 4. Ozone is added by a contactor in contactor cell 5 after which the water flows through cells 6 to 16 for further ozone disinfection while decay of the ozone occurs. Subsequent to cell 16 the water passes through a pair of filters 17 and 18 and then through a chemical addition region 19, where additional chlorine is added.

The following are examples of the invention and processes outside the scope of the invention. Such examples are not intended to be limiting upon the scope of the invention.

EXAMPLE 1

Water from Lake Mead was passed through a continuous-flow pilot treatment plant consisting of chemical addition, ozonation, coagulation, flocculation and biological filtration. Ozone was injected into the water in an ozone contactor. The ozone contactor consisted of a single water containing cell with ozone addition followed by eleven cells for ozone decay and disinfection. Bromate formation profiles were conducted to determine the bromate formation through the contactor under four different pretreatment conditions. The conditions that were investigated included: no pretreatment prior to ozonation, chlorine at 0.5 milligrams per liter of water (mg/L), ammonia at 0.3 milligrams per liter of water and the combination of chlorine and ammonia at the same dosages. Two types of ozone addition were used to develop the profiles, one method was to use a constant ozone dose and the second method was to use a constant Cryptosporidium log inactivation, a measurement indicative of the degree of microorganism disinfection achieved by the process used. The log inactivation was determined through the use of a CT (concentration times time) value as described in USEPA SWTR Guidance Manual utilizing data specific to previous testing of ozone inactivation with ozone for Lake Mead water. When a constant ozone dose was applied, the log inactivation varied depending upon the pretreatment. When a constant log inactivation was used, the required transferred ozone dose varied depending upon the pretreatment. Table 1 shows a summary of the Cryptosporidium log inactivation achieved when the ozone dose was constant and the required transferred ozone dose when Cryptosporidium inactivation was constant at 2.0-log.

TABLE 1

Calculated Inactivation and Required Ozone Dose for Bromate Profiles

| | Constant Dose | | Constant Inactivation | |
| --- | --- | --- | --- | --- |
| Pretreatment | Transferred Ozone Dose (mg/L) | Crypto Inactivation (log) | Transferred Ozone Dose (mg/L) | Crypto Inactivation (log) |
| No Pretreatment with chlorine or ammonia | 1.65 | 1.7 | 1.64 | 2.0 |
| Chlorine | 1.65 | 3.2 | 1.29 | 2.0 |
| Ammonia | 1.65 | 1.4 | 1.80 | 2.0 |
| Combination | 1.65 | 2.1 | 1.55 | 2.0 |

As shown in Table 1, at a constant ozone dose, chlorine addition significantly increased Cryptosporidium inactivation and ammonia addition decreased Cryptosporidium inactivation when compared with no pretreatment. Also, at a constant ozone dose using the combination of chlorine and ammonia resulted in a greater log inactivation than achieved without chemical addition pretreatment. The same trends were evident in the constant inactivation testing where chlorine addition, both alone and in combination with ammonia, required less ozone, and ammonia addition required more ozone than with no chemical addition pretreatment. Therefore, the addition of a small amount of chlorine will reduce the ozone dose required to meet 2.0-log inactivation of Cryptosporidium. This shows that addition of chlorine or chlorine followed by ammonia results in a lower ozone dosage required to achieve the same amount of inactivation when using the "CT" concept to estimate inactivation. It is believed that this results from a higher initial ozone residual as well as a longer lasting ozone residual, and thus carries over to any means of measuring disinfection or oxidation efficiency.

EXAMPLE 2

With the process as described in Example 1, bromate formation was monitored three times per week and several bromate formation profiles were conducted. Elongated testing was conducted utilizing a chlorine dose of 0.5 mg/L and an ammonia dose of 0.3 mg/L for bromate mitigation. Ammonia was dosed at 0.3 mg/L to provide a large enough concentration of this compound to calculate the removal produced by biological filtration. However, it is foreseen that an ammonia dose of 0.1 mg/L, in combination with chlorine, should normally be sufficient to meet the bromate formation goal of less than 5 micrograms per liter of water. As expected, the higher ammonia concentration produced very favorable bromate formation results. The raw water bromide, post ozonation bromate and filter effluent bromate concentrations observed during elongated testing are listed in Table 2.

TABLE 2

Bromide and Bromate Summary.

| | Average | Maximum | Minimum |
|---|---|---|---|
| Raw Water Bromide | 59 micrograms/L | 90 micrograms/L | <50 micrograms/L[1] |
| Post Ozone Bromide | 3.5 micrograms/L | 6.9 micrograms/L | <2 micrograms/L[1] |
| Filter No. 1 Bromate | 3.4 micrograms/L | 6.5 micrograms/L | <2 micrograms/L[1] |
| Filter No. 2 Bromate | 3.3 micrograms/L | 8.2 micrograms/L | <2 micrograms/L[1] |

[1]Detection Limit

The bromide concentration ranged from less than 50 to 90 milligrams per liter of water and averaged 59 milligrams per liter of water. Average bromate concentrations for all three sample points were less than the water quality goal of 5 milligrams per liter of water.

In addition to the samples that were collected during normal operation of the pilot plant, several bromate formation profiles were conducted to determine the bromate formation through the ozone contactor under four different pretreatment conditions as described in the last example. The conditions that were investigated included: no chemical pretreatment with either chlorine or ammonia, chlorine at 0.5 mg/L, ammonia at 0.3 mg/L, and the combination of chlorine and ammonia at the same dosages. The bromate formation profiles for each of the four pretreatment scenarios using both of the ozone dosing methods are shown in FIGS. 2 and 3.

Figure 2:
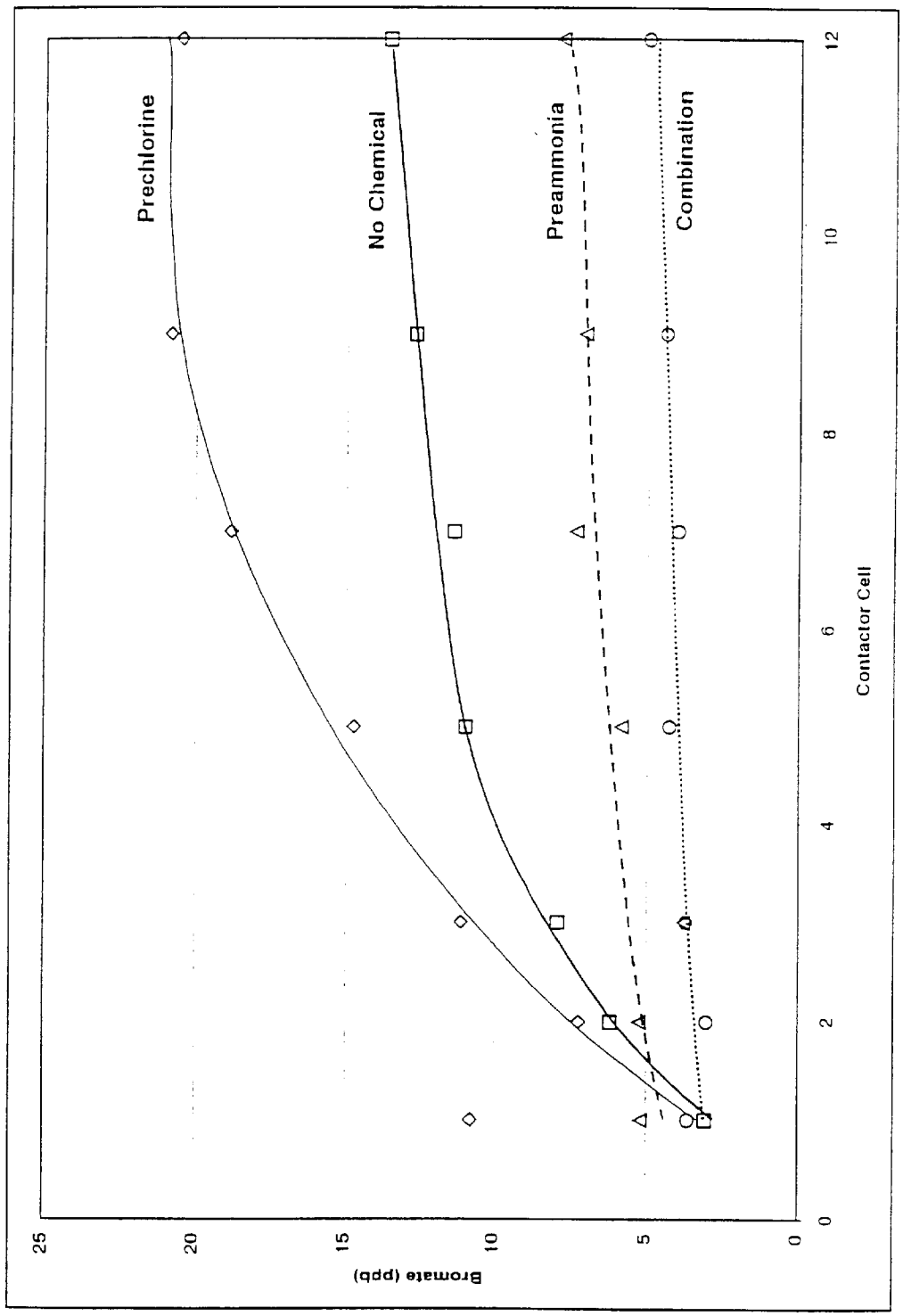
FIG. 2 is a chart showing bromate concentration versus treatment cells for various processes described in Example 2 with a constant dose of ozone.
Figure 3:
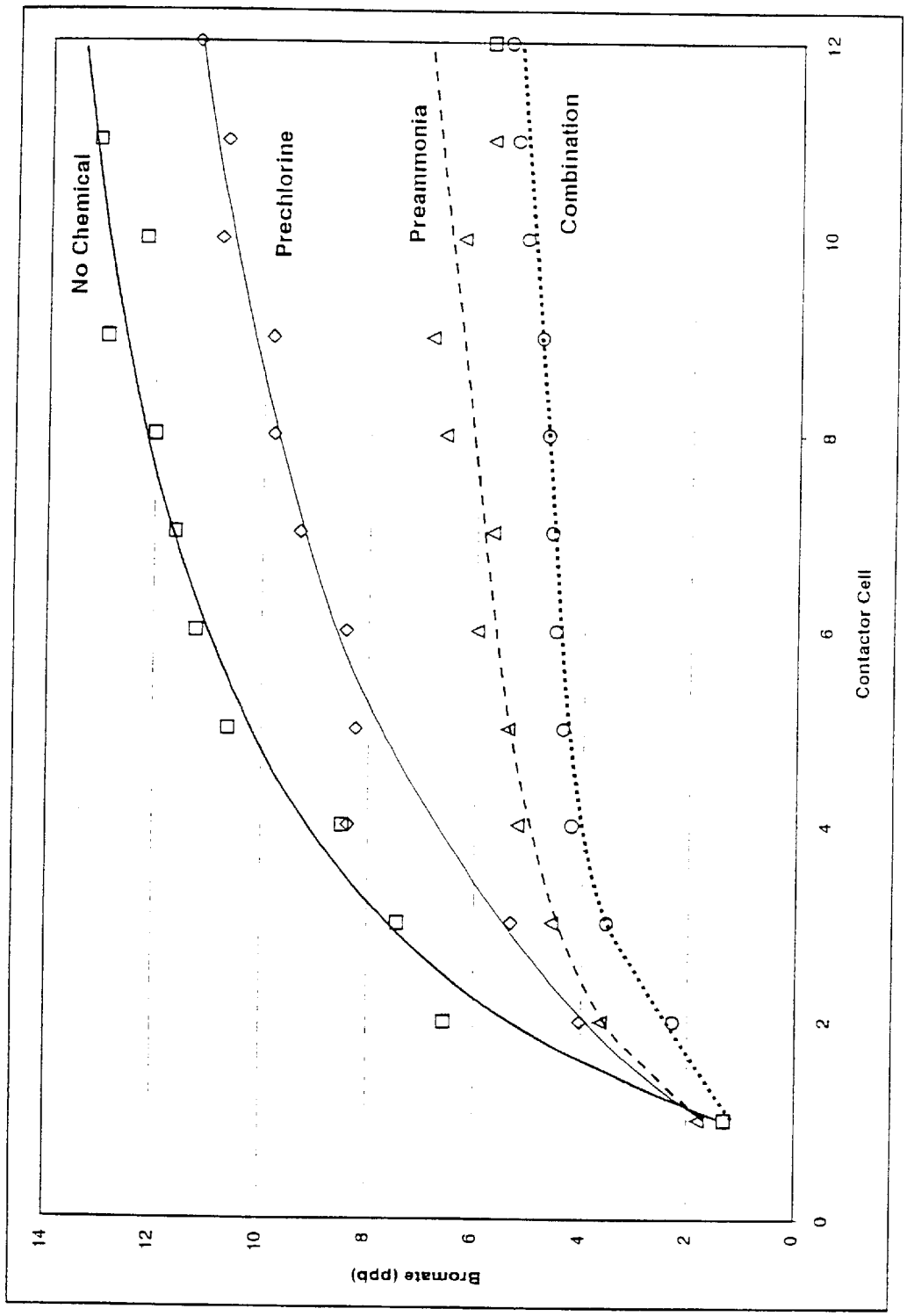
FIG. 3 is a chart showing bromate concentration versus treatment cells for various processes described in Example 2 with a constant log inactivation.

Both FIGS. 2 and 3 show that the formation of bromate in the first ozonation cell does not appear to be significantly effected by pretreatment. However, the rate of bromate formation through the remainder of the ozone contactor is strongly impacted by the pretreatment provided. The bromate formation curves produced when ammonia addition is not provided are much steeper than the curves formed when ammonia is added. In both tests, the combination of chlorine and ammonia produced the lowest bromate formation.

FIG. 2 shows that the combination of prechlorination and ammonia reduces bromate formation to a larger extent than no chemical addition, pretreatment with chlorine alone, or pretreatment with ammonia alone at the same ozone dosage. FIG. 3 shows that prechlorination reduces the amount of ozone necessary to achieve the same inactivation or oxidation while reducing bromate formation when compared to no pretreatment. It also shows that the combination of prechlorination and ammonia provides the lowest finished water bromate concentrations at a consistent level of inactivation.

EXAMPLE 3

Using the plant described in Example 1, testing of biological filtration was conducted over a three-month period. The testing focused on the biological filters and the effects of the bromate mitigation technique, described above and using pretreatment with chlorine and ammonia, on biofiltration. The ozone and pretreatment system operation was constant during the testing with conditions set at 0.5 mg/L of chlorine, 0.3 mg/L of ammonia and a 2-log Cryptosporidium inactivation. Each filter was run under separate conditions to evaluate more than one operating scenario concurrently. Filter No. 1 was run at a constant 6 gallons per minute/sf filtration rate for the first half of the phase and then was changed to a variable rate filter for the last half of the phase. The effect of chlorinated and dechlorinated backwash water was investigated by backwashing Filter No. 2 with dechlorinated water for the first 11 weeks and then switching to chlorinated backwash water for the last three weeks of the period. Parameters that were monitored as indicators of biofilter performance included: turbidity, particle counts, head loss, ammonia, nitrite, nitrate, AOC (assimiable organic carbon), HPC (hetertrophic plate count), aldehydes, carboxylic acids and chlorine demand after filtration.

Figure 4:
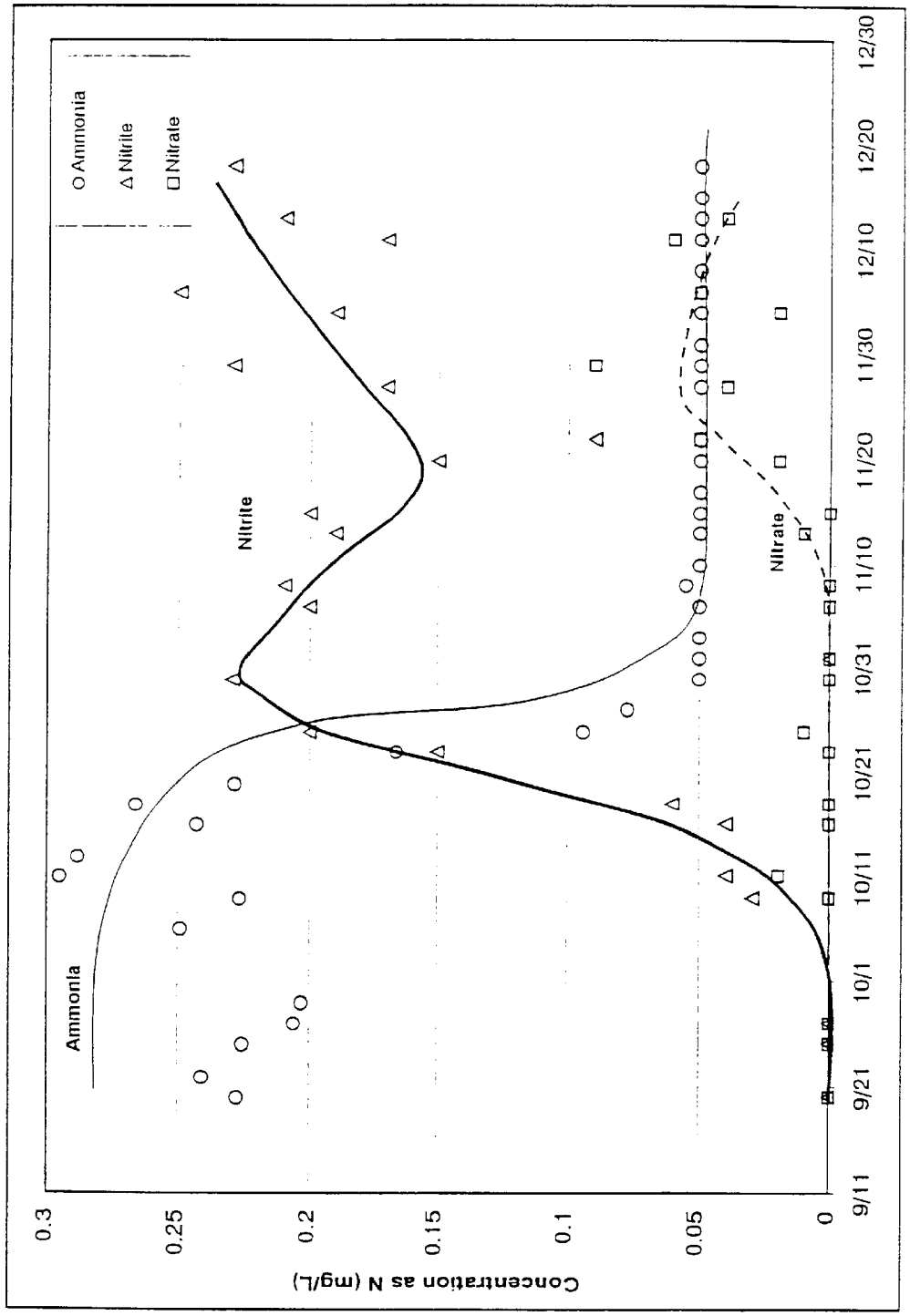
FIG. 4 is a chart showing concentrations of various nitrogen compounds versus date, as described in Example 3 at filter 1.
Figure 5:
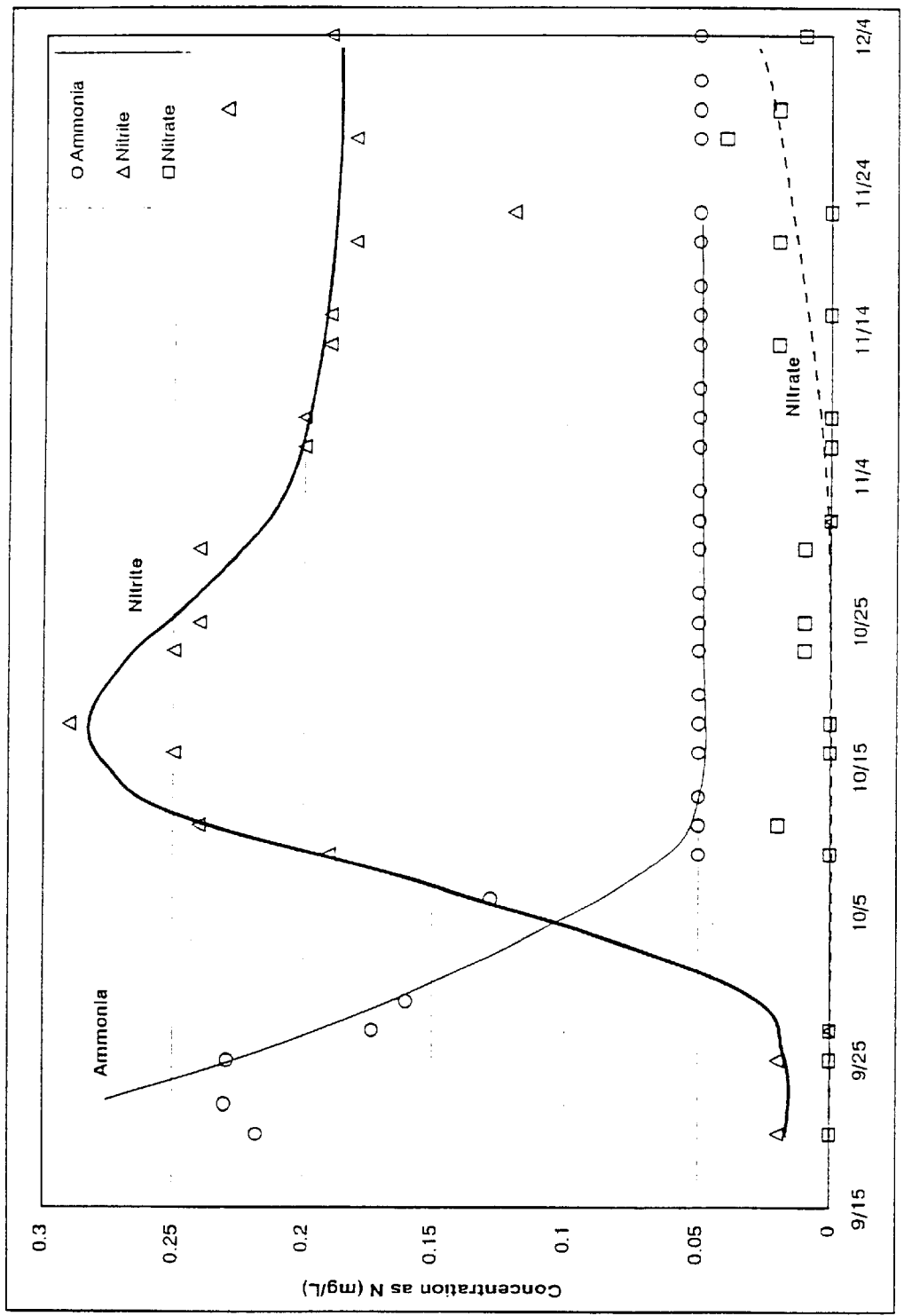
FIG. 5 is a chart showing concentrations of various nitrogen compounds versus date, as described in Example 3 at filter 2.

A benefit of biological filtration is the removal of ammonia that has been added prior to ozonation for bromate mitigation. Removal of the ammonia from the filter effluent is desirable because the ammonia exerts a significant chlorine demand when a free chlorine residual is desired in the distribution system. Biofiltration with ammonia active microbes can nitrify ammonia to nitrite, which has half the chlorine demand of ammonia, and then nitrate, which has no chlorine demand. During this testing, ammonia was dosed at 0.3 mg/L in the raw water and the ammonia-nitrogen, nitrite-nitrogen, and nitrate-nitrogen concentrations were measured before and after the biofilters. FIGS. 4 and 5 show the ammonia-nitrogen, nitrite-nitrogen, and nitrate-nitrogen concentrations in the effluents from both of the filters over the course of testing.

FIG. 4 shows that after approximately one month of operation, following the ozonation process with biological filtration can result in a reduction of ammonia to less than 0.05 mg/L (the detection limit for these tests) independent of whether the filter is operated in constant flow or variable flow rate modes. It was found that switching from a constant flow mode to a variable flow mode did not affect ammonia removal but did affect the conversion of nitrite to nitrate. The recovery in the nitrate-nitrogen concentration that is shown to occur after the dip that starts to develop on 10/31 may be associated with the start of the variable flow rate tests. It is possible that the relatively thick biological slime layer that was loosely attached to the media when the water was passing through the filter at a constant flow rate produced anaerobic conditions in the layer of slime next to the media and denitrification started to occur. This contributed to the drop in nitrite concentration that occurred until the variable flow tests started on 11/13. The higher velocity flow peaks may have washed the excess biological growth off the media and restored aerobic conditions throughout the slime layer. This may have produced an increase in nitrite despite the loss in nitrite produced by the subsequent formation of nitrate.

As shown in FIG. 5, the nitrification process started to occur much sooner in Filter No. 2. Filter No. 2 began removing ammonia after only two weeks and the conversion of nitrite to nitrate appears to be more rapid. However, neither filter was able to fully oxidize ammonia to nitrite and then to nitrate. Therefore, it appears that a population of Nitrosomonas was present but the slower growing Nitrobacter was not well established.

These results show that the use of biological filtration following the process can be enhanced by reducing the ammonia load from the filters. The difficulty in establishing a population of Nitrobacter makes the reduction in the initial ammonia levels more important, as this will reduce the amount of nitrite that would require subsequent chlorination.

EXAMPLE 4

As part of the testing described in EXAMPLE 3, samples that were tested for assimiable organic carbon were collected once per week from the raw water, from the water after the ozone contactor and from the effluent of both filters. In addition to the sampling conducted in the pilot plant, the assimiable organic carbon (AOC) concentrations in the full-scale plant effluent were also obtained for comparison with the pilot plant results. All of the AOC data are presented on FIG. 6.

Figure 6:
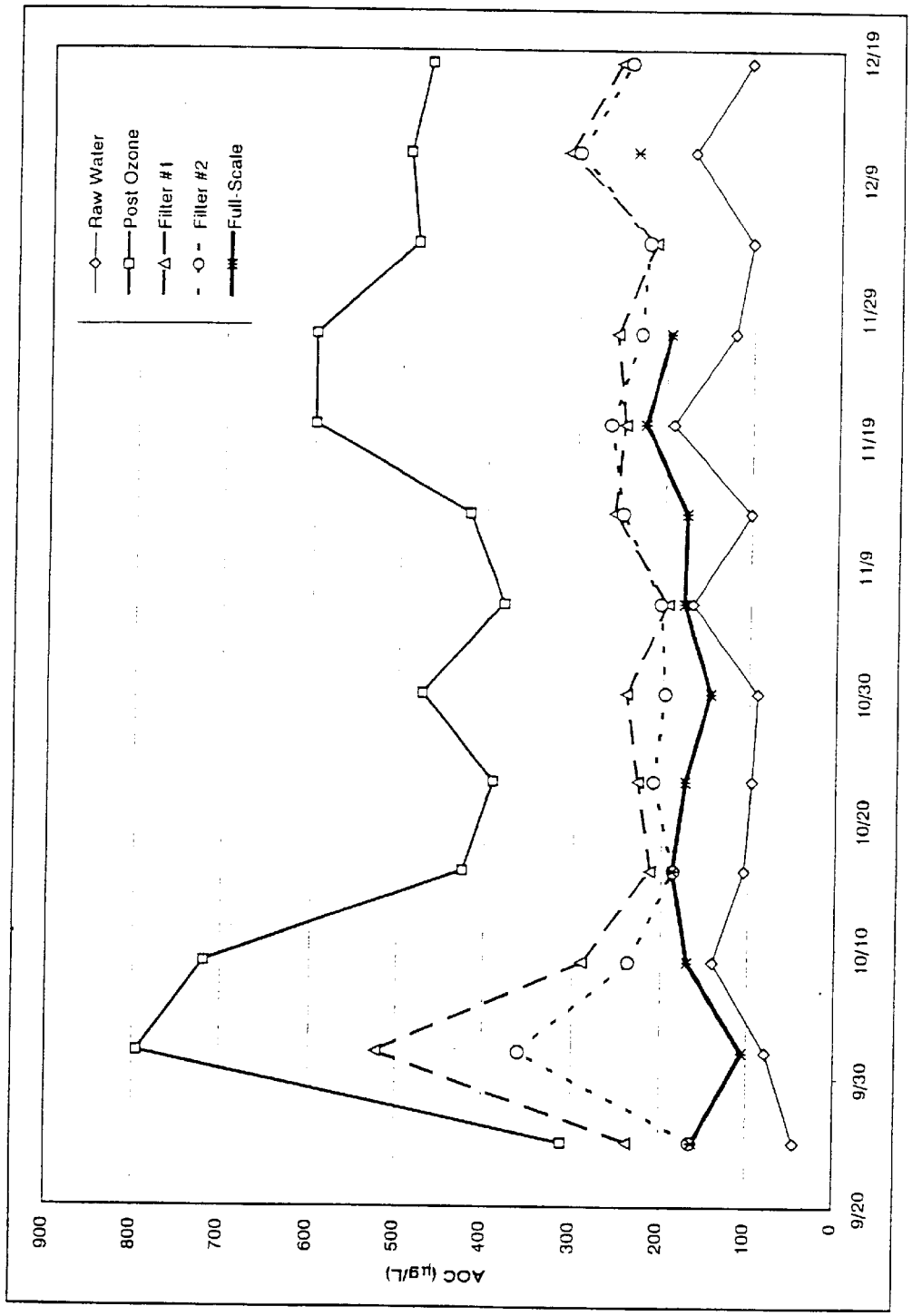
FIG. 6 is a chart showing assimiable organic carbon reduction (AOC) versus date, as described-in Example 4.

As shown in FIG. 6, there is a significant increase in AOC after ozonation. The biofilters are utilized to convert at least part of the AOC to non-AOC. Without biofiltration there would be a significant increase in the AOC concentration in the water sent into the distribution system. However, after biological filtration the AOC has been reduced. Biofiltration helps minimize the impact of ozonation on the growth of microorganisms in the distribution system.

Samples were collected twice a week to measure aldehyde concentrations in the raw water, after ozonation and in the effluent of both filters. Seven aldehydes were measured in each sample: acetaldehyde, butanal, formaldehyde, glyoxal, pyruvic aldehyde, pentanal and propanal. The results of these measurements are shown in FIG. 7.

Figure 7:
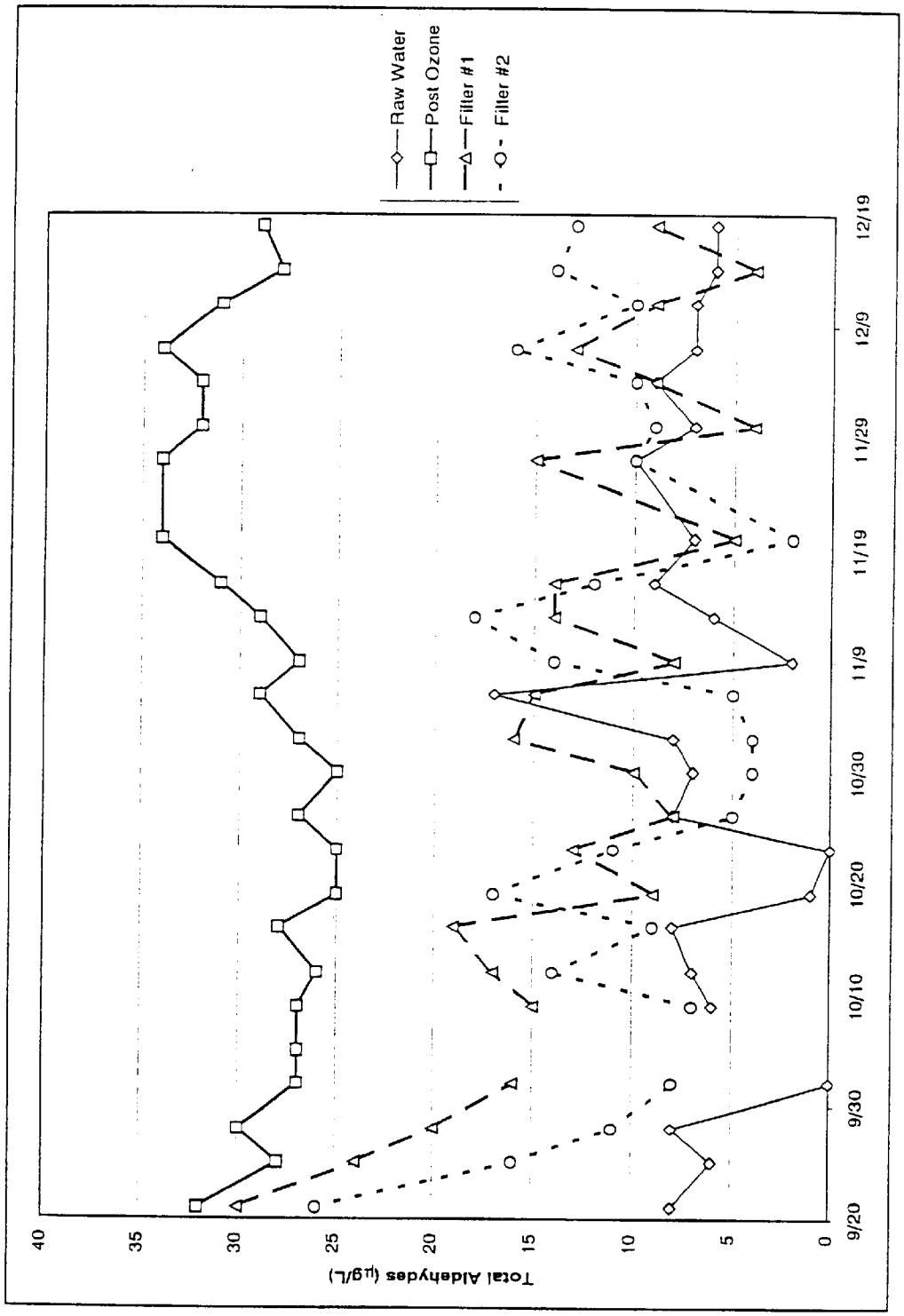
FIG. 7 is a chart showing aldehyde reduction versus date, as described in Example 4.

As shown on FIG. 7, the concentrations of total aldehydes increased significantly after ozonation from 5 to 10 micrograms per liter of water in the raw water into the range of 25 to 30 micrograms per liter of water after ozonation. At the beginning of testing, little removal of aldehydes occurred through the filters, but eventually the total aldehyde concentrations in the filter effluent began to decrease to levels that were similar to those in the raw water because of the biological population in the filters.

These data show that the proposed process, when followed by biofiltration, can have an added benefit of reducing carbon-based byproducts. Such reduction provides further improvement to the finished water through the production of a more biologically stable system.

It is to be understood that while certain forms of the present invention have been illustrated and described herein, it is not to be limited to the specific forms or arrangement of parts described and shown.

What is claimed and desired to be secured by Letters Patent is as follows:

1. In a process for treatment of water containing concentrations of bromides by ozone, the improvement comprising the step of:
   a) prior to treatment of said water by ozone, treating said water with chlorine, so as to reduce formation of bromates in the water; and
   b) treating said water with ozone.

2. The process according to claim 1 wherein:
   a) said chlorine is injected into said water in an amount such that chlorine demand is substantially met and not exceeded subsequent to injection of said chlorine and prior to treatment with ozone so that substantially no free chlorine remains in the water.

3. The process according to claim 1 including the step of:
   a) subsequent to addition of chlorine and prior to treatment with ozone, adding a quantity of ammonia.

4. The process according to claim 3 wherein:
   a) said ammonia is added to said water at a rate between about 0.05 and 5.0 milligrams per liter of water.

5. The process according to claim 3 wherein:
   a) said ammonia is added to said water at a rate between about 0.1 and 0.5 milligrams per liter of water.

6. The process according to claim 3 wherein:
   a) said ammonia is added to said water at a rate of approximately 0.1 milligrams per liter of water.

7. The process according to claim 1 wherein:
   a) ozone is introduced into said water in sufficient amount and for a sufficient period of residence time to produce substantially complete disinfection of said water.

8. The process according to claim 7 wherein:
   a) said ozone is exposed to said water for at least several minutes.

9. The process according to claim 1 wherein:
   a) said ozone is exposed to said water for at least a sufficient time to obtain a log 2 reduction in the number of microorganisms contained in said water.

10. The process according to claim 1 including the step:
    a) subsequent to the treatment of said water with ozone, passing said water through a filter.

11. The process according to claim 1 including the step:
    a) subsequent to the treatment of said water with ozone, passing said water through an active biota containing at least one microorganism adapted to reduce organic by-products formed in the water during ozone treatment.

12. The process according to claim 11 wherein:
    a) said by-products are selected from the group consisting of assimiable organic carbon, carboxylic acids, aldehydes and combination thereof.

13. The process according to claim 11 wherein:
    a) said biota is generally located on a filter.

14. The process according to claim 11 including the step:
    a) subsequent to treatment with ozone, allowing the residual ozone in the water to approach a non-detectable level prior to passing said water into said biota.

15. The process according to claim 1 including the step:
    a) subsequent to treatment of said water with ozone, treating said water with a second quantity of chlorine so as to produce a residual level of chlorine in said water.

16. The process according to claim 15 wherein:
    a) said second quantity of chlorine is added in an amount sufficient to produce a residual level of free chlorine of at least 0.1 milligrams per liter of water.

17. The process according to claim 15 wherein:
    a) said second quantity of chlorine is added in an amount sufficient to produce a residual level of free chlorine of at least 1.5 milligrams per liter of water.

18. The process according to claim 1 including the step:
    a) treating said water in a continuous flow facility.

19. A process for disinfecting fresh water supplies wherein the water initially contains bromides, including the steps of:
    a) injecting a quantity of chlorine into said water; and
    b) subsequent to injecting said chlorine, injecting a quantity of ozone into said water sufficient to substantially complete disinfection of said water such that said chlorine reduces the amount of ozone required to disinfect said water and thereby reduces conversion of said bromides to bromates by said ozone as compared to disinfecting without said chlorine.

20. The process according to claim 19 wherein:
    a) said chlorine is injected into said water in an amount such that chlorine demand is substantially met and not exceeded subsequent to injection of said chlorine and prior to treatment with ozone so that substantially no free chlorine remains in the water.

21. The process according to claim 19 including the step of:
a) subsequent to addition of chlorine and prior to treatment with ozone, adding a quantity of ammonia.

22. The process according to claim 21 wherein:
a) said ammonia is added to said water at a rate between about 0.05 and 5.0 milligrams per liter of water.

23. The process according to claim 21 wherein:
a) said ammonia is added to said water at a rate between about 0.1 and 0.5 milligrams per liter of water.

24. The process according to claim 21 wherein:
a) said ammonia is added to said water at a rate of approximately 0.1 milligrams per liter of water.

25. The process according to claim 19 wherein:
a) ozone is introduced into said water in sufficient amount and for a sufficient period of residence time to produce substantially complete disinfection of said water.

26. The process according to claim 25 wherein:
a) said ozone is exposed to said water for at least several minutes.

27. The process according to claim 19 wherein:
a) said ozone is exposed to said water for at least a sufficient time to obtain a log-2.0 reduction in the number of microorganisms contained in said water.

28. The process according to claim 19 including the step:
a) subsequent to the treatment of said water with ozone, passing said water through a filter.

29. The process according to claim 19 including the step:
a) subsequent to the treatment of said water with ozone, passing said water through an active biota containing microorganisms adapted to reduce organic by-products formed in the water during ozone treatment.

30. The process according to claim 29 wherein:
a) said by-products are selected from the group consisting of assimiable organic carbon, carboxylic acids, aldehydes and combination thereof.

31. The process according to claim 29 wherein:
a) said biota is generally located on a filter.

32. The process according to claim 29 including the step:
a) subsequent to treatment with ozone, allowing the residual ozone in the water to approach a non-detectable level prior to passing said water into said biota.

33. The process according to claim 19 including the step:
a) subsequent to treatment of said water with ozone, treating said water with a second quantity of chlorine so as to produce a residual level of chlorine in said water.

34. The process according to claim 33 wherein:
a) said second quantity of chlorine is added in an amount sufficient to produce a residual level of free chlorine of at least 0.1 milligrams per liter of water.

35. The process according to claim 33 wherein:
a) said second quantity of chlorine is added in an amount sufficient to produce a residual level of free chlorine of at least 1.5 milligrams per liter of water.

36. A process for treating water so as to disinfect said water for human use comprising the steps of:
a) treating said water with a first quantity of chlorine approximately sufficient in amount so as to meet chlorine demand without forming a substantial residual chlorine amount in the water;
b) subsequent to step (a) adding ammonia to said water in an amount of at least 0.01 milligrams per liter;
c) subsequent to step (b) adding ozone to said water in an amount approximately sufficient to disinfect said water to a selected degree;
d) subsequent to step (c) passing said water through a filter having microorganisms thereon to reduce assimiable carbon, carboxylic acids and aldehydes to components that do not provide food for microorganisms; and
e) subsequent to step (d) injecting a second quantity of free chlorine in said water so as to provide a residual level of chlorine of 0.1 milligrams per liter.

37. The process according to claim 36 wherein:
a) said ammonia is injected in an amount between 0.1 and 5.0 milligrams per liter of water;
b) said second quantity of chlorine is injected in an amount to provide a residual free chlorine level of at least about 1.5 milligrams per liter;
c) said process is a continuous flow treatment process; and including the step of
d) supplying microorganisms on said filter to also convert residual ammonia in said water to nitrates.

38. A water treatment facility for treatment of water containing bromides and adapted to reduce the formation of bromates comprising:
a) a continuous flow water containing channel;
b) a chlorine injection system adapted to inject chlorine into said water in said channel; and
c) an ozone disinfection system adapted to inject ozone into said water subsequent to injection of said chlorine into said water; whereby bromate formation is reduced.

39. The facility according to claim 38 including:
a) an ammonia injection system adapted to inject ammonia into said water between whereat said chlorine and said ozone are injected respectively.

40. The facility according to claim 38 including:
a) a filter supporting microorganisms adapted to reduce organic compounds to components not edible by microorganisms located subsequent to whereat said ozone is injected.

41. The facility according to claim 38 wherein:
a) said chlorine injection system is a first chlorine injection system; and including
b) a second chlorine injection system adapted to inject chlorine into said water subsequent to whereat ozone is injected into said water.

* * * * *